(12) United States Patent
Li

(10) Patent No.: US 10,870,089 B2
(45) Date of Patent: Dec. 22, 2020

(54) HYDROPHILIC GRAPHITIC MATERIAL

(71) Applicant: 4th Phase Technologies, Inc., West Chester, PA (US)

(72) Inventor: Chunhong Li, West Chester, PA (US)

(73) Assignee: 4th Phase Water Technologies, Inc., West Chester, PA (US)

( * ) Notice: Subject to any disclaimer, the term of this patent is extended or adjusted under 35 U.S.C. 154(b) by 222 days.

(21) Appl. No.: 15/826,406

(22) Filed: Nov. 29, 2017

(65) Prior Publication Data

US 2018/0264416 A1 Sep. 20, 2018

Related U.S. Application Data

(60) Provisional application No. 62/471,225, filed on Mar. 14, 2017.

(51) Int. Cl.
| | |
|---|---|
| *B01D 67/00* | (2006.01) |
| *B01D 69/02* | (2006.01) |
| *B01D 71/02* | (2006.01) |
| *B01D 71/52* | (2006.01) |
| *B01D 71/66* | (2006.01) |
| *B01D 71/82* | (2006.01) |
| *C01B 32/158* | (2017.01) |
| *C02F 1/44* | (2006.01) |
| *C01B 32/22* | (2017.01) |

(Continued)

(52) U.S. Cl.
CPC ....... *B01D 71/021* (2013.01); *B01D 67/0088* (2013.01); *B01D 69/02* (2013.01); *B01D 71/66* (2013.01); *B01D 71/82* (2013.01); *C01B 32/158* (2017.08); *C01B 32/22* (2017.08); *C02F 1/44* (2013.01); *B01D 71/52* (2013.01); *B01D 2325/14* (2013.01); *B01D 2325/36* (2013.01); *C01B 2202/08* (2013.01); *C02F 2101/308* (2013.01); *C02F 2101/32* (2013.01); *C02F 2305/08* (2013.01); *Y02W 10/37* (2015.05)

(58) Field of Classification Search
None
See application file for complete search history.

(56) References Cited

U.S. PATENT DOCUMENTS

2003/0161950 A1* 8/2003 Ajayan ................ B82Y 30/00
427/249.1
2011/0280793 A1* 11/2011 Keller .................. C01B 32/16
423/447.2

(Continued)

OTHER PUBLICATIONS

Abu-Dari, K.; Raymond, K. N.; Freyberg, D. P. *J. Am. Chem. Soc.* 1979, 101, 3688-3689.

(Continued)

*Primary Examiner* — Bradley R Spies
(74) *Attorney, Agent, or Firm* — Barnes & Thornburg LLP; Ryan L. Marshall; Jonathan Hartley

(57) ABSTRACT

This disclosure relates to a hydrophilic graphitic material. The graphitic material may be a carbon nanotube film having superior chemical, mechanical and electrical properties compared to traditional membrane materials. The hydrophilic graphitic material includes a kosmotropic polymer or kosmotropic molecule coating that increases the hydrophilicity of a graphitic material. Methods for preparing the hydrophilic graphitic material are disclosed along with potential applications and uses.

19 Claims, 3 Drawing Sheets

(51) Int. Cl.
*C02F 101/30* (2006.01)
*C02F 101/32* (2006.01)

(56) References Cited

U.S. PATENT DOCUMENTS

2013/0120908 A1* 5/2013 Eweka ............... C01D 15/06
361/502
2014/0326600 A1 11/2014 Li et al.
2014/0330100 A1 11/2014 Li et al.
2015/0246814 A1 9/2015 Li et al.

OTHER PUBLICATIONS

Balamurugan, K.; Baskar, P.; Kumar, R. M.; Das, S.; Subramanian, V. *J. Phys. Chem. C.* 2012, 116, 4365.
Bhattacharyya, I.; Maze, J. T.; Ewing, G. E.; Jarrold, M. F. *J. Phys. Chem. A*, 2011, 115, 5723-5728.
Chaplin, M. http://www1.isbu.ac.uk/water/hofmeister_series.html, webpage established 2001 and last updated Apr. 5, 2018.
Chaplin M. http://www1.isbu.ac.uk/water/icosahedral_water_clusters.html#ES.
Chaplin, M. http://www1.isbu.ac.uk/water/kosmotropes_chaotropes.html, webpage established 2001 and last updated Apr. 4, 2018.
Chen, C.; Huang, C.; Waluvo, I.; Weiss, T.; Pettersson, L. G. M.; Nilsson, A. *Phys. Chem. Chem. Phys.* 2015, 17, 8427-8430.
Conway, B. E.; Ayranci, E. *J. Solution Chem.* 1999, 28, 163-192.
Li, C.; Lee, H. *Chem. Eng. Sci.* 2000, 55, 655-665.
Cooper, R. J.; DiTucci, M. J.; Chang, T. M.; Williams, E. R. *J. Am. Chem. Soc.* 2016, 138, 96-99.
Das, R.; Pollack, G. H. *Langmuir* 2013, 29, 2651-2658.
Del Giudice, E.; Fuchs, E. C.; Vitiello, G. *Water* 2010, 2, 69-82.
Homma, Y.; Chiashi, S.; Yamamoto, T.; Kono, K.; Matsumoto, D.; Shitaba, J.; Sato, S. *Phys. Rev. Lett.* 2013, 110, 157402.
https://en.wikipedia.org/wiki/Double_layer_(surface_science), revised Jan. 26, 2018, downloaded Apr. 20, 2018.
https://en.wikipedia.org/wiki/Heparin, revised Mar. 29, 2018, downloaded Apr. 20, 2018.
Johnston, J. C.; Kastelowitz, N.; Molinero, V. 2010, 133, 154516.
Jung, Y.; Song, J.; Huh, W.; Cho, D.; Jeong, Y. *Chem. Eng. J.* 2013, 228, 1050-1056.
Kastelowitz, N.; Johnston, J. C.; Molinero, V. 2010, 132, 124511.
Light, T. P.; Corbett, K. M.; Metrik, II., M. A.; MacDonald, G. *Langmuir* 2016, 32, 1360-1369.
Lin, H.; Lagoute, J.; Repain, V.; Chacon, C.; Girard, Y.; Ducastelle, F.; Amara, H.; Loiseau, A.; Hermet, P.; Henrard, L.; Rousset, S. *Phys. Rev. B.* 2010, 81, 235412.
Luo, X. G.; Huang, X. X.; Wang, X. X.; Zhong, X. H.; Meng, X. X.; Wang, J. N. *ACS Appl. Mat. & Interfaces* 2016, 8, 7818-7825.
Lupi, L.; Kastelowitz, N.; Molinero, V. *J. Chem. Phys.* 2014, 141, 18C508.
Minsky, A.; Meyer, A. Y.; Rabinovitz, M. *J. Am. Chem. Soc.* 1982, 104, 2475-2482.
O'Brien, J. T.; Prell, J. S.; Bush, M. F.; Williams, E. R. *J. Am. Chem. Soc.* 2010, 132, 8248-8249.
Shannon, M. A.; Bohn, P. W.; Elimelech, M.; Georgiadis, J. G.; Marinas, B. J.; Mayes, A. M. *Nature* 2008, 452, 301-310.
Skinner, L. B.; Benmore, C.J.; Shyam, B.; Weber, J. K. R.; Parise, J. B. *Proc. Nat. Acad. Sci. USA* 2012, 109, 16463-16468.
Sun, W., Liu, J.; Chu, H.; Dong, B. *Membranes* 2013, 3, 226-241.
Wei, Z.-F.; Zhang, Y.-H.; Zhao, L.-J.; Liu, J.-H.; Li, X.-H. *J. Phys. Chem. A* 2005, 109, 1337-1342.
Xie, W. J.; Gao, Y. Q. *J. Phys. Chem. Lett.* 2013, 4, 4247-4252.
Xu, W.; Chen, Y.; Zhan, H.; Wang, J. N. *Nano Lett* 2016, 16, 946-952.
Yang, M.; Senet, P.; Van Alsenoy, C. *Int. J. Quantum Chem.*, 2005, 101, 535-542.
Zhou, M.; Nemade, P. R.; Lu, X.; Zeng, X.; Hatakeyama, E. S.; Noble, R. D.; Gin, D. L. *J. Am. Chem. Soc.* 2007, 129, 9574-9575.
Zilch, L.W.; Maze, J. T.; Smith, J. W.; Ewing, G. E.; Jarrold, M. F. *J. Phys. Chem. A* 2008, 112, 13352-13363.

* cited by examiner

HYDROPHILIC GRAPHITIC MATERIAL

BACKGROUND

1. Field of the Invention

The present disclosure generally relates to hydrophilic graphitic materials. More particularly the disclosure relates to the preparation of new hydrophilic graphitic materials by modifying the surface of the graphitic material with kosmotropic polymers or kosmotropic molecules that are able to facilitate an orderly water layer formation adjacent to the surface and therefore significantly increases the hydrophilicity of the graphitic material.

2. Description of the Related Art

Clean water is an essential resource. Both population growth and the expansion of industrial and agricultural activities are making available fresh water increasingly scarce. At the same time, wastewater production and the contamination of surface water and groundwater are on the rise. There is, therefore, a need in the art for effective water treatment methods and techniques for removing contaminants from water.

Membrane filtration provides effective solutions to remove contaminants in water, but achieving high permeability, good selectivity, and antifouling ability remains a great challenge for existing membrane filtration technologies. Membrane fouling from microorganism deposition and growth, chemical corrosion, natural organic materials, and inorganic scaling negatively affect membrane performance that leads to lower flux rates, higher energy consumption, and higher maintenance and operational costs. Currently, the most pressing need in water purification is the development of membranes with high contaminants rejection rate and high productivity, reduced transmembrane pressure, and superior antifouling properties.

Most commercial filtration membranes are made of hydrophobic polymeric materials. Those commonly used for microfiltration (MF) and ultrafiltration (UF) membranes include cellulose acetate, polyvinylidene fluoride (PVDF), polyacrylonitrile (PAN), polypropylene, polysulfone, and polyethersulfone (PES). Cellulose acetate and polyamide materials dominate membranes for nanofiltration (NF) and reverse osmosis (RO). Each polymer exhibits different properties with respect to surface charge, degree of hydrophobicity and hydrophilicity, level of tolerance toward pH and oxidizing agents, mechanical strength, and flexibility. For example, cellulose acetate membranes are susceptible to biodegradation and have a narrow operational pH range of 4 to 8. Polyamide RO membranes, on the other hand, can be used under a wide range of pH and are not readily subject to biodegradation.

Membrane material is at the heart of MF, UF, NF and RO processes. The hydrophobic nature of the polymeric materials, however, renders commercial filtration membranes vulnerable to fouling. The fouling may originate from inorganic compounds, particulates, or microbial or organic matter. Consequently, filtration performance inevitably decreases over time. There exists a great need, therefore, in developing new filtration membrane materials that overcome the shortcomings associated with polymeric membranes.

Incorporation of carbon nanotube (CNT) powder into polymer to make composite membrane has been shown to increase membrane hydrophilicity and flux rate. However, CNT loss from CNT powder polymer composite membrane over time is a major concern. Besides, as-grown pristine CNTs tend to bundle and aggregate together due to hydrophobicity, making it difficult to uniformly disperse CNTs into polymers for composite preparation. As a result, it is necessary to chemically treat pristine CNTs with strong acid at elevated temperature, for example reflux in concentrated $HNO_3$ and $H_2SO_4$ for extended periods of time to introduce hydrophilic —OH and —COOH groups so that CNTs become more hydrophilic. However, the use of corrosive strong acids for introducing —OH and —COOH groups onto CNT surface frustrates efforts to diminish environmental impacts and complicates scale up for mass production. Furthermore, it is challenging to control the extent of —OH and —COOH group introduction on CNTs. Fundamentally, the covalent introduction of —OH and —COOH groups can only happen when the CNT structure is damaged, thus a covalently functionalized CNT surface has more structural defects that invariably will change the electronic and mechanical properties of the CNT. These altered properties and structural defects often promote, rather than prevent, fouling of the CNT surface.

Non-covalent approaches have been developed to circumvent the problems associated with covalently modifying CNTs. One approach is to use poly(ethylene glycol) monoalkyl ether. It is believed the hydrophobic alkyl group will preferentially interact with hydrophobic CNT surface and bring hydrophilic poly(ethylene glycol) moiety close to the surface of the CNT. The resulting CNTs become hydrophilic due to the presence of the hydrophilic poly(ethylene glycol) moiety. Free —OH groups in the poly(ethylene glycol) polymer chains can be further cross-linked resulting in a more stable hydrophilic layer. The long-term chemical stability of poly(ethylene glycol) alkyl ethers and cross-linkers, however, can still be of concern. When the crosslinked poly(ethylene glycol) degrades in a filtration membrane, the organic degradation products could leach into the permeate. Additionally, poly(ethylene glycol) monoalkyl ether-modified CNTs may lack sufficient hydrophilicity to prevent surface fouling.

Other non-covalent approaches include the use of surfactant molecules such as Triton X-100 and sodium dodecyl sulfate (SDS) to disperse CNT powder in order to make CNT polymer composite membrane. Surfactant molecules have been known to disperse CNT powder. It is believed the hydrophobic alkyl group in surfactant molecule will preferentially interact with hydrophobic CNT surface and bring its hydrophilic moiety close to the surface of the CNT. The resulting CNTs become more hydrophilic due to the presence of the hydrophilic moiety from surfactant. The long-term stability of surfactant molecules near CNT surface, however, remains in question. Surfactant molecules are soluble in water and many polar organic solvents. When adsorbed on CNT surface, surfactant molecules can also potentially leach into permeate during filtration process.

Because of the many potential problems with CNT powder polymer composite membrane, CNT film membrane may be more uniquely qualified as an alternative for water filtration membrane. Recently, flow catalyst chemical vapor deposition (FCCVD) has made it possible to prepare large areas (e.g. 1 m×1 m) of CNT film membrane, which can be assembled into spiral wound filters for use in MF, UF, NF and RO processes. CNT film membranes are formed in the reactor into a network of interlocked, intertwined bundles of long nanotubes, not as single or small aggregates of nanotubes with micrometer lengths as is found in CNT powder polymer composite membrane. Thus, CNT film membranes provide structural integrity with substantial improvement in chemical stability and mechanical strength from CNT powder composite membrane. For example, CNT film membranes are resistant to acid and base, and are insoluble in organic solvents. The loss of CNT from CNT film membrane during water filtration is also highly unlikely.

However, as-grown pristine CNT film membrane is hydrophobic and therefore has very low water permeability. Hydrophobicity also makes CNT film membrane prone to surface fouling when used in water filtration. Existing approaches (e.g., strong acid treatment, use of surfactants or hydrophilic polymers) to increase the hydrophilicity of CNT powder are not without major concerns. To make CNT film membrane useful new material in water filtration, there remains a need in the art for the provision of new approaches to render CNT film membrane hydrophilic.

BRIEF SUMMARY

In some embodiments, a hydrophilic material is disclosed. The hydrophilic material may include a graphitic material having a surface and a kosmotropic polymer or kosmotropic molecule adjacent to the surface, wherein the kosmotropic polymer or kosmotropic molecule may be selected from the group consisting of $SO_3$, $SO_3$ polymer, $SO_3$ complex, and an ether or a polyether comprising at least one $OSO_3^-$ group.

In other embodiments, a method of preparing a hydrophilic material is disclosed. The method may include forming a kosmotropic polymer coating or a kosmotropic molecule coating on a surface of a graphitic material, wherein the kosmotropic polymer coating or kosmotropic molecule coating may include a kosmotropic polymer or kosmotropic molecule selected from the group consisting of $SO_3$, $SO_3$ polymer, an $SO_3$ complex and an ether or a polyether having at least one —$OSO_3^-$ group.

In other embodiments, a method of removing water from an aqueous solution is disclosed. The method may include introducing an aqueous solution into a device having a membrane that may include a hydrophilic material. The hydrophilic material may include a graphitic material having a surface and a kosmotropic polymer or a kosmotropic molecule adjacent to the surface of the graphitic material which can lead to the formation of an orderly water layer adjacent to the surface of the graphitic material. The method may also include contacting the aqueous solution with the membrane, and passing water through the membrane to produce filtered water.

In some embodiments, a hydrophilic material prepared by a process is disclosed. The process may include treating a graphitic material with $SO_3$, $SO_3$ polymer or an $SO_3$ complex.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
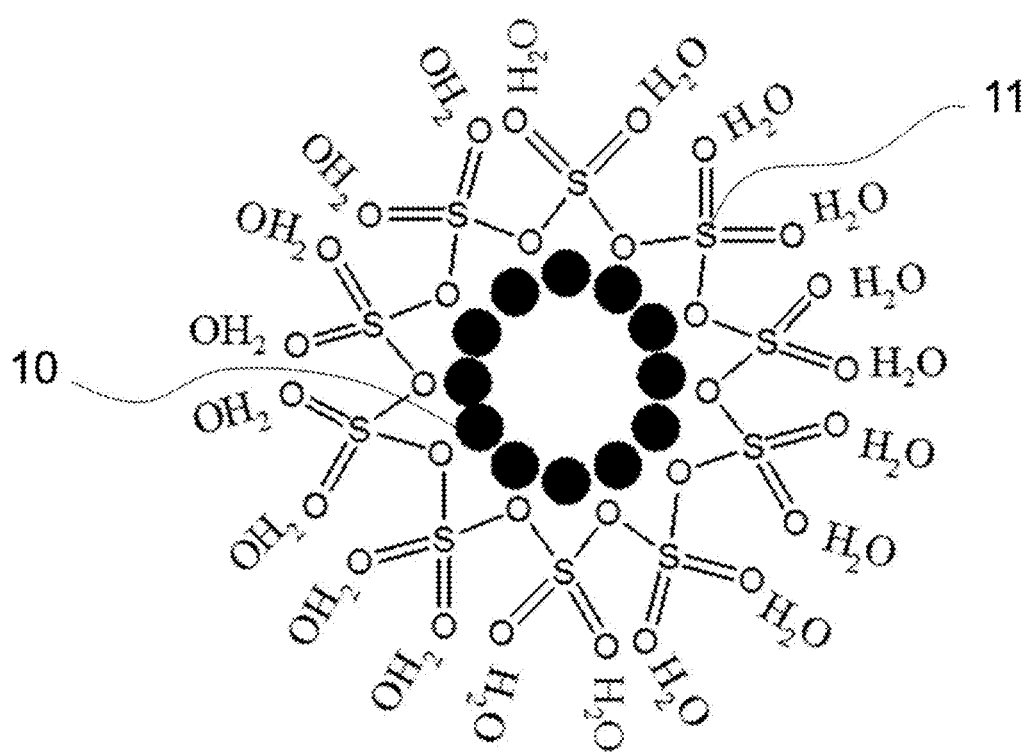
FIG. 1 shows a cross-sectional view of one embodiment of the invention in which a hydrophilic graphitic material is coated with an $SO_3$ polymer; it is possible such polymer structure can lead to orderly water layer formation adjacent to CNT surface.

Various embodiments are described below with reference to the drawings in which like elements generally are referred to by like numerals. The relationship and functioning of the various elements of the embodiments may better be understood by reference to the following detailed description. Embodiments, however, are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Even though there exists a large body of research work on improving the anti-fouling property of filtration membranes, to date, no strategy has fundamentally addressed the root cause of fouling. Various strategies have been employed to introduce hydrophilic moieties onto the surface of hydrophobic membranes, but the number and density of such hydrophilic moieties in most cases are not sufficient. As a result, most commercial filtration membranes do not have the requisite hydrophilicity to overcome three major contributing factors to fouling: hydrophobic-hydrophobic interactions, opposite charge attraction to membrane surface, and the release of low entropy surface water.

A hydrophilic graphitic material as disclosed herein can address the limitations of conventional filtration membranes mentioned above. The disclosed hydrophilic graphitic materials exhibit superior wettability over non-modified graphitic material.

In some embodiments, the graphitic material may be an amorphous or crystalline graphite. In other embodiments, the graphitic material may be a graphene sheet or graphene powder. The graphitic material may include fullerene.

In some embodiments, the graphitic material may include CNTs. CNTs exhibit extraordinary mechanical strength and chemical stability making them ideal candidates as a membrane material. The graphitic material may include carbon nanotubes (CNTs) in the form of a film, cloth, membrane, paper, fiber, or powder. The CNTs may be single walled CNTs, multi-walled CNTs, or double-walled CNTs. The graphitic material may be a CNT film. The CNT film may be synthesized using established methods, such as but not limited to, floating catalyst chemical vapor deposition. The orientation of CNTs in the film can be random, partially or fully aligned, horizontally or vertically aligned.

Without being bound by theory, graphene and CNTs have strong dipoles or alternating positive and negative charges (or partial charges) and, therefore, interact strongly with dipole molecules such as water. Recent progress in CNT and graphene research has discovered charge separation in CNT and graphene materials. The p orbitals on carbon atoms may recombine to form molecular orbitals and such atomic orbital recombination results in the non-uniform electron density distribution across the CNT surface at the atomic scale. In other words, non-uniform electron density distribution across CNT surface can be interpreted as charge separation.

Recent advances in CNT research has demonstrated that a thin layer of water molecules (layer thickness in the range of nanometers) naturally wraps around single-walled CNT. This layer of water is intimately interacting with CNT and thus behaves very differently from typical bulk water. For example, it is very difficult to remove such a layer of water even under high vacuum at elevated temperature. The layer of structured water, however, is likely insufficient to render CNT membrane hydrophilic enough for filtration purposes. Without being bound by theory, the hydrophilic graphitic materials disclosed herein induce intermolecular structure in water beyond a single layer creating a thick entropic barrier.

Inducing intermolecular structure in water can be accomplished by introducing a kosmotropic polymer or kosmotropic molecules close to the surface of the graphitic material. The kosmotropic polymer or kosmotropic molecules may also generate kosmotropic anions. Ions exhibiting strong interactions with water molecules are called structure-makers or kosmotropes that are strongly hydrated and facilitate the formation of more stable network structures of water. Such kosmotropes lead to much larger variations in hydration shell water vibrations than cations, indicating much stronger interaction between such anions and hydration shell water molecules.

Examples of strong anionic kosmotropes include citrate$^{3-}$, $SO_4^{2-}$, $HPO_4^{2-}$ and $CH_3CO_2^-$. $SO_4^{2-}(H_2O)_n$ clusters form from individual sulfate ions and water molecules to a distance much farther than a first solvation shell. Polyatomic anions such as $SO_4^{2-}$ and $PO_4^{3-}$ form stable, highly ordered, high-density water clusters. In the presence of strongly hydrated $SO_4^{2-}$ ions, water-water and water-ion interactions increase (relative to water-water interactions or hydrogen bonding in bulk water), while in the presence of weakly hydrated $Cl^-$ and $ClO_4^-$ ions, such interactions decrease. Ions exhibiting weaker interactions with water than water itself are structure-breakers or chaotropes. Such ions are weakly hydrated, and their presence disrupts water-water interactions and destabilize structured water. Examples of chaotropes include $ClO_4^-$ and $NO_3^-$.

In some embodiments, the kosmotropic molecule adjacent to the surface of a graphitic material may include $SO_3$ or an $SO_3$ complex. Without being bound by any theory, when these molecules cover the CNT surface and react with water to generate kosmotropic ion $SO_4^{2-}$, orderly water layer can form around CNT and thus drastically increase the hydrophilicity of the CNT film membrane. Alternatively, treating CNTs with $SO_3$ or an $SO_3$ complex may lead to the formation of the kosmotropic polymer $SO_3$ polymer adjacent to the surface of a graphitic material. The graphitic material may be entirely or substantially covered with the $SO_3$ polymer. The graphitic material may be a CNT film and the kosmotropic polymer may be an $SO_3$ polymer.

The $SO_3$ polymer, which may be described by the formula $[S(=O)_2(\mu-O)]_n$, can associate with the surface of a CNT. Without being bound by any theory, the $SO_3$ polymer may wrap around CNT surface due to strong charge-dipole and dipole-dipole interaction. An $SO_3$ polymer may be formed in the presence of a trace amount of water, where $SO_3$ molecules condense to form fibrous α-$SO_3$ polymer of high molecular weight. Each end of an $SO_3$ polymer may be terminated with a hydroxyl group.

FIG. 1 shows an embodiment where an $SO_3$ polymer 11 associates with the electronic distribution on the surface of the graphitic material 10. Water may then form an orderly layer over the $SO_3$ polymer.

Without being bound by any theory, the alternating positive and negative charges in CNT may strongly interact with oxygen atoms (partially negative) and sulfur atoms (partially positive) in the $SO_3$ polymer chains. The remaining oxygen atoms attached to sulfur [$S(=O)(=O)$] may be partially negative, and they may preferentially interact with hydrogen atoms in water molecules. Multiple favorable interactions are present in this structural arrangement. First, the orderly electronic structure of CNT may fortify the stability of the orderly $SO_3$ polymer structure around the CNT even with only non-covalent interactions. Second, the kosmotropic $SO_3$ polymer brings water molecules close to the CNT and ensures a thicker layer of orderly water present around the CNT. The orderly water layer may protect the $SO_3$ polymer wrapped around CNT from hydrolysis. Third, the orderly water layer may interact more strongly with the orderly CNT structure and high density of $S(=O)(=O)$ groups. The synergistic interactions make the overall CNT-$SO_3$ polymer-$H_2O$ structure and the orderly water layer extremely stable, thus rendering the CNT membrane material exceptionally hydrophilic with a thicker layer of orderly water.

Without being bound by any theory, the kosmotropic molecule or kosmotropic $SO_3$ polymer induce a thick, orderly layer of water around the graphitic material. The orderly water layer can be stably established around the CNT and make the CNT membrane exceptionally more hydrophilic than those functionalized with conventional CNT surface chemistry. This approach eliminates the need to covalently introduce —OH groups or —COOH groups via strong oxidizing acid treatment, which is known to damage CNT surface and results in defects which inevitably compromise CNT quality.

Figure 2:
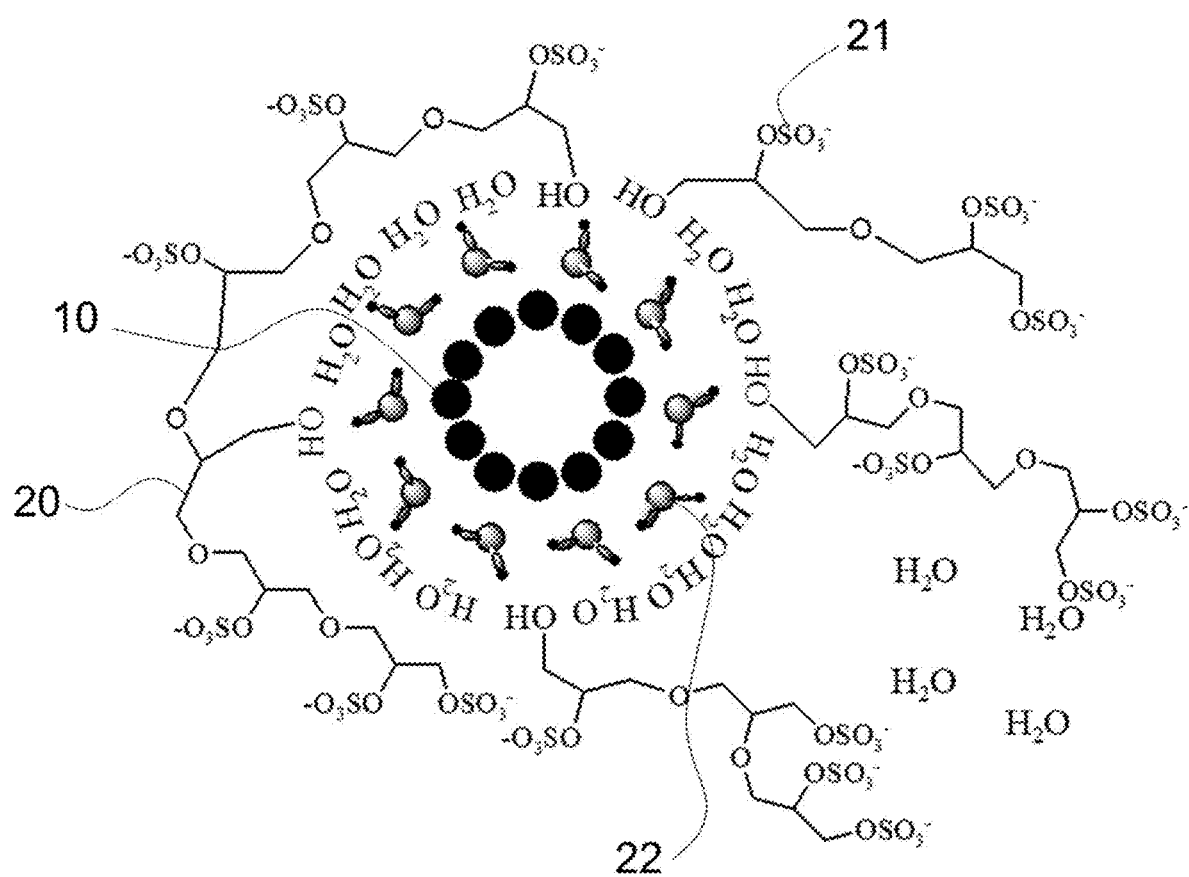
FIG. 2 shows a cross-sectional view of one embodiment of the invention in which a hydrophilic graphitic material is coated with an ether or polyether having kosmotrope groups.

In some embodiments, the kosmotropic polymer is an ether or polyether that includes at least one $OSO_3^-$ group. FIG. 2 shows an embodiment where the kosmotropic molecule is an ether or polyether 20 that includes at least one $OSO_3^-$ group 21. A layer of water 22 may intervene between the ether or polyether and the graphitic material 10.

In other embodiments, the kosmotropic molecule may include at least one —$OPO_3H^-$, —$COO^-$, or citrate$^{3-}$ group. The presence of kosmotropes on the surface provides a layer of highly ordered water having high stability and high density. Without being bound by any theory, the ordered layer of water may function as a barrier or entropic barrier to surface fouling by ions, particulates, or microorganisms present in water.

In some embodiments, the ether or polyether may be formed by reacting with glycerol diglycidyl ether with an —OH group or water. In some embodiments, the ether or polyether may be formed by reacting with glycerol glycidyl ether with an —OH group or water. In certain embodiments, the ether or polyether may include —OH groups. The —OH groups can be converted to strongly hydrating anions as mentioned above.

In other embodiments, the ether or polyether may be formed using one or more of polyethylene glycol diglycidyl ether, trimethylolethane triglycidyl ether, trimethylolpropane triglycidyl ether, glycerol diglycidyl ether, glycerol triglycidyl ether, diglycerol polyglycidyl ether, triglycerol polyglycidyl ether, polyglycerol polyglycidyl ether, pentaerythritol glycidyl ether, pentaerythritol polyglycidyl ether, sorbitol polyglycidyl ether and the like.

Without being bound by any theory, it is believed that when strongly hydrated anions such as $ROSO_3^-$ are present on the membrane surface, the anions attract a layer of structured water molecules (where R is an alkyl group, for example an alkyl group having from 1 to 12 carbon atoms, 1 to 6 carbon atoms, 1 to 4 carbon atoms, 1 to 2 carbon atoms, or 1 carbon atom (methyl) which can be straight, branched or cyclic depending on the number of carbon atoms). As a result, water molecules closest to the membrane surface have different properties. For example, the first one to two layers of water near a flat surface have a dielectric constant of 6, while that for typical water in bulk is 80. So clearly water molecules close to a surface interact with external charge (ions) differently from those in the bulk because of the influence from surface. Due to the orientation (alignment) of water near the surface, the interaction among these water molecules themselves should also be different from those in bulk water. Such a layer of structured water molecules is significantly different from bulk water and thus stable enough to resist surface fouling from contaminants in feed-water.

Without being bound by any theory, upon heating, —OH groups in adsorbed water layer can undergo epoxide ring opening reaction with glycidyl ethers. The outcome is the covalent attachment of more —OH groups or excess epoxide groups that can further react with water, ethylene glycol, glycerol and polyols including saccharides. A large number of —OH groups, therefore, can be quickly introduced onto CNT surface in this manner. Once these —OH groups are converted to kosmotropic ion such as —$OSO_3^-$, the CNT surface can become exceptionally hydrophilic.

Methods of Preparing a Hydrophilic Graphitic Materials

In some embodiments, a method is disclosed for preparing a hydrophilic material. The method may include forming a kosmotropic molecule coating or kosmotropic polymer coating on a surface of a graphitic material. The kosmotropic molecule or kosmotropic polymer coating may include $SO_3$, $SO_3$ polymer, an $SO_3$ complex or an ether or a polyether having at least one —$OSO_3^-$ group.

A kosmotropic molecule or kosmotropic polymer may be introduced onto a graphitic material by first drying the graphitic material. The dried graphitic material may be treated with a sulfating agent such as but not limited to $SO_3$ (liquid or vapor), $SO_3$ pyridine complex, $SO_3$ trimethyl amine complex, $SO_3$ triethyl amine complex, or $SO_3$ DMF complex at a temperature between 25° C. and 150° C., perhaps between 40° C. and 100° C. The sulfating agent may be added with or without additional solvent for a period of time from a few hours to 24 hours or 72 hours in vacuo or under air pressure. In some embodiments, the solid forms of a sulfating agent can be directly sprayed on a graphitic material as a fine powder. Upon the completion of the reaction, the graphitic material may be rinsed with deionized water to remove excess reagent and then dried in air or soaked in water.

In other embodiments, a kosmotropic polymer coating may be formed from an ether or a polyether having at least one $OSO_3^-$ group. The graphitic material may be treated with glycerol diglycidyl ether or any other glycidyl ethers already mentioned above. The glycidyl ether can be sprayed or drop cast with or without being dissolved in an appropriate solvent onto the graphitic material. The glycidyl ether may be reacted with the graphitic material at temperature ranging from 25° C. to 100° C. for a period of 1 hour to 24 hours. After reacting, the resulting CNT membrane may be rinsed with methanol and water. The resulting CNT membrane has hydrophilic properties. Similar chemistry and processes can be applied to CNT and graphene powder to render such material hydrophilic.

In other embodiments, the method may include converting hydroxyl groups on the ether or polyether to a strongly hydrated kosmotropes. After treating the graphitic material with a glycidyl ether, a sulfating agent may be added, such as but not limited to $SO_3$ pyridine complex, $SO_3$ trimethyl amine complex, $SO_3$ triethyl amine complex, or $SO_3$ DMF complex. The sulfating agent may be added and reacted with the material at temperature between 25° C. and 150° C., preferably between 60° C. and 100° C. with or without solvent for a period of time ranging from a few hours to 12 hours or 24 hours. In some embodiments, a solid form of the sulfating agent can be directly sprayed on graphitic material surface as a powder or dissolved in a solvent. Upon the completion of the reaction, the material may be rinsed with deionized water to remove excess reagent. These procedures may be applied to different graphitic materials such as CNT films, powders, fibers, or graphene films or powders.

Product by Process

In some embodiments, a hydrophilic material is disclosed that may be prepared by a process that includes treating a graphitic material with $SO_3$ (liquid or vapor) at ambient temperature to 40° C. The graphitic material may be a CNT film. The orientation of CNTs in the film can be random, partially or fully aligned, horizontally or vertically aligned.

In some embodiments, a hydrophilic material is disclosed that may be prepared by a process that includes treating a graphitic material with an $SO_3$ complex. The $SO_3$ complex may be a $SO_3$ pyridine complex, $SO_3$ trimethyl amine complex, $SO_3$ triethyl amine complex, or $SO_3$ DMF complex and mixtures of the same. The $SO_3$ complex may be $SO_3$ triethylamine. The graphitic material may be described above. In some embodiments, the graphitic material may be a CNT film. The orientation of CNTs in the film can be random, partially or fully aligned, horizontally or vertically aligned.

In some embodiments, the process of preparing a hydrophilic material may include heating the $SO_3$ complex and the graphitic material at a temperature ranging from 60° C. to 150° C. The temperature may range from 70° C. to 150° C., 80° C. to 150° C., 80° C. to 120° C., 90° C. to 110° C., or 90° C. to 100° C. In some embodiments, the temperature may be 100° C.

In some embodiments, the heating step described above may be for a duration ranging from 10 hours to 72 hours. The heating duration may range from 10 hours to 30 hours, or 20 hours to 72 hours. The heating duration may be about 24 hours.

In certain embodiments, the process of preparing a hydrophilic material may include heating the $SO_3$ complex and the graphitic material at a temperature ranging from 60° C. to 150° C. under a reduced pressure. The $SO_3$ complex and the graphitic material may be heated under vacuum. In some embodiments, the vacuum may be released before cooling the treated graphitic material. In some embodiments, the vacuum may be released and the heating may continue for a duration ranging from 5 minutes to 60 minutes, 10 minutes to 50 minutes, 5 minutes to 30 minutes, 20 minutes to 40 minutes, or 30 minutes to 60 minutes.

In some embodiments, the graphitic material may be treated with a weight ratio of the $SO_3$ complex to the graphitic material ranging from 0.1:1 to 50:1. In certain embodiments, the weight ratio of the $SO_3$ complex to the graphitic material may range from 0.5:1 to 50:1, 1:1 to 50:1, 0.1:1 to 25:1, 0.1:1 to 20:1, 0.1:1 to 10:1, 0.1:1 to 5:1, 0.1:1 to 1:1, 0.5:1 to 25:1, 0.5:1 to 20:1, 0.5:1 to 10:1, 0.5:1 to 5:1, or 0.5:1 to 1:1. The weight ratio of the $SO_3$ complex to the graphitic material may be 1:1.

Methods of Using a Hydrophilic Graphitic Material

The hydrophilic graphitic material of this application may be used in any filtration membrane. The filtration membrane may be used to separate water from any dissolved or suspended material in the water.

In some embodiments, the hydrophilic graphitic material may be dispersed or uniformly within a polymer composite.

In other embodiments, the hydrophilic graphitic material may be a film that is adjacent to other membrane materials. The film may be placed between an impermeable sheet and a permeable sheet in a spiral wound membrane module, for example. The hydrophilic graphitic material may be used in reverse osmosis membranes, ultrafiltration membranes, nanofiltration membranes, or ultrafiltration membranes. The membranes could be used to remove ions, dissolved material, or microbes from the water.

In some embodiments, a method is provided for removing water from an aqueous solution. The method may include introducing an aqueous solution into a device that has a membrane. The membrane may include a hydrophilic graphitic material as described above. The method may also include contacting the aqueous solution with the membrane and passing water through the membrane to produce filtered water.

In some embodiments, the hydrophilic graphitic material may be used in solar cells, energy storage applications, or batteries. Due to impressive hydrophilic properties of the disclosed graphitic material, the material may be useful in CNT-based sensing devices, especially electrochemical sensors. The hydrophilic graphitic material may be antifouling and could be used in applications where minimal biological interaction is desired. For example, the hydrophilic graphitic material may be used as a coating for implantable medical devices or for modifying container surfaces that carry biologically important solutions.

EXAMPLES

Example 1 Hydrophilicity Testing

Figure 3:
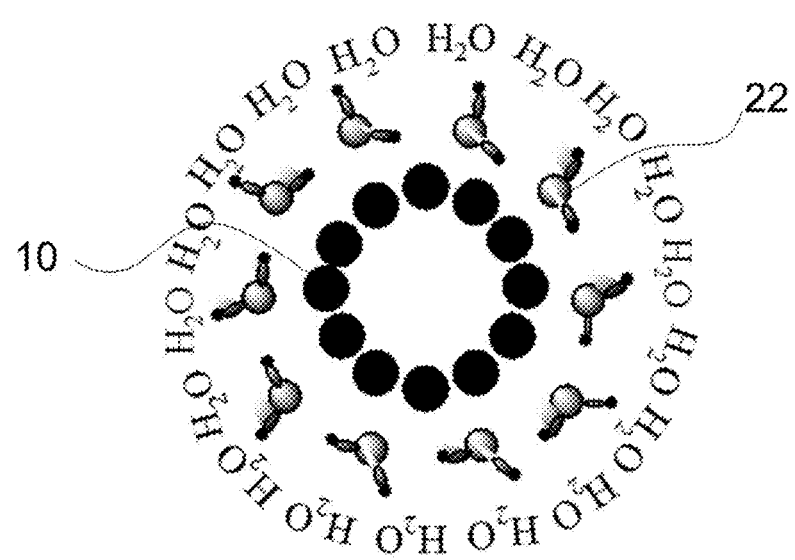
FIG. 3 shows a cross-sectional view of one embodiment of the invention with a graphitic material where a water layer is adjacent to the material surface at the nanometer scale.

Three CNT films were prepared: Sample 1 (e.g. FIG. 1), Sample 2 (e.g. FIG. 2), and Sample 3 (e.g. FIG. 3). Sample 1 was a CNT film with an $SO_3$ polymer formed by treating the CNT film with $SO_3$ triethyl amine complex at a temperature of 100° C. in vacuo for a period of time from 2 hours to 24 hours. Sample 2 was prepared by treating a CNT film with glycerol diglycidyl ether at a temperature of 90° C., for a period of 1 hour to 24 hours, followed by rinsing with methanol and water to remove excess reagent. The treated CNT film was then air dried and then treated with an excess amount of $SO_3$ triethyl amine complex at temperature between 25° C. and 150° C. for a period of time from a few hours to 24 hours in vacuo. Upon the completion of the reaction, the CNT film (Sample 2) was rinsed thoroughly with deionized (DI) water and placed on aluminum foil to dry in air at ambient temperature before hydrophilicity testing. Sample 3 was an unmodified CNT film.

All three samples were placed on a board. A water droplet (50 µL) was placed on the left side of each sample. The board was slowly raised from the left side so the samples were tilted toward the right. As three water droplets reached the edge of respective CNT film sample, the water droplet rushed onto the CNT film of Sample 1, while the water droplet stayed near the edge of CNT film of Sample 3, clearly demonstrating significantly improved hydrophilicity with $SO_3$ polymer incorporation. The droplet next to Sample 3 stayed near the edge even when the board was raised to vertical position. The water molecules in the adsorption layer in Sample 3 interact strongly among themselves and only interact weakly with outer water molecules, thus Sample 3 appeared the most hydrophobic among all 3 samples.

As Sample 2 was tilted, the water droplet slowly moved onto the CNT film, distinct from Sample 1 where water droplet rushed onto the CNT film, and also different from the sample on the right Sample 3 where water droplet did not move onto the CNT film even when the board underneath was raised to vertical position. The hydrophilicity of Sample 2 with glycerol diglycidyl ether then $SO_3$ triethyl amine complex chemistry was clearly between that of Sample 1 and Sample 3.

Example 2 Water Permeation Testing

Unmodified CNT films are typically impermeable to water under moderate pressure. A CNT film coupon (~2.0 mg, 25 mm in diameter) was placed in a Millipore stainless steel syringe filter holder, which was attached to a polypropylene syringe. The syringe plunger was pressed with both hands and no permeation of water could be observed.

Treating unmodified CNT film with water alone is not effective in improving water permeation. For example, a CNT film coupon (~2.0 mg, 25 mm in diameter) was placed in a vacuum chamber and was heated at 100° C. for 2 hours and deionized water was introduced to cover the coupon. After 24 hours, the vacuum was released and the CNT film was tested in a Millipore stainless steel syringe filter holder for water permeation as described above. A water flux of 1.20 g/min was obtained. Continued soaking of the CNT film in water did not increase the flux. Upon drying the CNT film in air for 3 days, the water flux dropped to <0.5 g/min.

Treating unmodified CNT film with organic solvents such as ethylene glycol and methanol can temporarily increase water permeation. For example, a CNT film coupon (~2.0 mg, 25 mm in diameter) was soaked in ethylene glycol for 24 hours, rinsed with water and immediately tested for water permeation to a water flux of ca. 9 g/min. Continuous soaking in deionized water for 3 days did not increase the water flux. Upon drying the CNT film in air for 3 days, the water flux quickly dropped to <2 g/min. Repeated soaking of the same CNT film in ethylene glycol reproduced a large increase in flux. After soaking in deionized water for 10 days, the water flux reached 11.86 g/min when tested as described above. Upon drying the film in air for 3 days, the water flux dropped to <1.2 g/min.

Similar behavior was observed when a CNT film was soaked in methanol alone for 24 hours and tested immediately. The maximum water flux reached was ca. 8.6 g/min after continuous soaking in water for 3 days. Upon drying the CNT film in air for 3 days, the water flux decreased >50%. In another experiment, a CNT film was soaked in methanol alone for 24 hours and then soaked in deionized water for up to 8 days leading to a maximal water flux of 14.6 g/min. Additional soaking in water for 2 more days led to a water flux of ca. 10 g/min. Upon drying in air for 3 days, the water flux dropped to ca. 7-8 g/min, although the decline in flux appeared more slowly than that with ethylene glycol treatment. After an additional 7 days of drying in air, the flux further dropped to ca. 2.5 g/min. Thus, the water layer formed around CNTs due to organic solvent soaking is very unstable and prone to evaporation. Once such a water layer is lost, the CNT film becomes hydrophobic and impermeable to water again.

It is well established that CNT can become more hydrophilic when treated with nonionic surfactant poly(ethylene glycol) alkyl ethers, e.g., Brij® S100 (C18EG100, polyoxyethylene (100) stearyl ether, formula $C_{18}H_{37}(OCH_2CH_2)_nOH$, n~100). Thus, a CNT film coupon (~2.0 mg, 25 mm in diameter) was soaked in Brij® S100 methanol solution (10 mg/mL, 1 mL) for 24 hours before the solvent was evaporated in air by placing the vial on a hot plate at 75° C. The vial was then covered with aluminum foil and placed in a vacuum oven at 90° C. in vacuo for 24 hours. After the vacuum was released, the sample was kept in the oven at 90° C. for 30 minutes before it was removed, cooled to ambient temperature, and rinsed profusely with deionized water until no bubbles were visible. The CNT film was slightly slippery upon touch. The water flux reached ca. 5 g/min when tested immediately after rinsing. After extended soaking in water for 3 days, the water flux increased to ca. 6.7 g/min. However, upon drying the CNT coupon in air for 1 day, the water flux quickly dropped to ca. 2.5 g/min, suggesting the hydration layer formation due to the presence of Brij® S100 around CNT is highly unstable.

A CNT film coupon (~2.0 mg, 25 mm in diameter) was first soaked in Brij® S100 methanol solution, then heated at 90° C. in vacuo for 24 hours, rinsed with water, dried in air and then treated with $SO_3$ triethylamine complex (100 mg) at 100° C. in vacuo for 24 hours. After the vacuum was released, the sample was kept in the oven at 100° C. for 30 minutes before it was removed, cooled to ambient temperature. Upon rinse with deionized water, bubbles formed all over the CNT film and the rinse appeared soapy, indicating the loss of C18EG100 or the sulfated form C18EG100-$SO_3^-$. After soaking in water continuously for 12 days, the water flux remained ca. 5 g/min. Drying in air for 1 day resulted in a decrease of water flux to 2.5 g/min. Further drying in air for 3 days led to a water flux of ca. 2 g/min, indicating this combination of chemical process does not result in stable long-term hydrophilicity of the CNT membrane.

A CNT film coupon (~2.0 mg, 25 mm in diameter) was first soaked in Brij® S100 methanol solution, then heated at 90° C. in vacuo for 24 hours, rinsed with water, dried in air and then treated with glycerol diglycidyl ether (100 μL) at 90° C. in vacuo for 24 hours. After the vacuum was released, the sample was kept in the oven at 90° C. for 30 minutes before it was removed, cooled to ambient temperature, and rinsed with methanol and water. The water flux reached a maximum of 7.8 g/min when tested immediately after rinsing. After drying the CNT film in air for up to 4 days, the water flux maintained between 5.5 g/min and 7.24 g/min, indicating CNT film can become more hydrophilic by introducing more hydroxyl groups close to the CNT surface.

An additional CNT film coupon (~2.0 mg, 25 mm in diameter) was treated with Brij® S100 solution, rinsed with water, dried in air and then treated with glycerol diglycidyl ether (GDGE) (100 μL) at 90° C. in vacuo for 24 hours. After the vacuum was released, the sample was kept in the oven at 90° C. for 30 minutes before it was removed, cooled to ambient temperature, and rinsed with methanol and water. The CNT film was then dried in air for 1 day before it was treated with $SO_3$ triethylamine complex (100 mg) at 100° C. in vacuo for 24 hours. After the vacuum was released, the sample was kept in the oven at 100° C. for 30 minutes before it was removed, cooled to ambient temperature, and rinsed with water. The water flux reached 8.92 g/min when tested immediately after rinse. Continuous soaking in water did not result in a significant change in water flux. Upon drying in air for 3 days, the water flux decreased slightly to 7.56 g/min. Upon further drying in air for 4 to 7 days, the flux decreased to ca. 5 g/min, indicating this combination of chemistry is not optimal in rendering CNT film membrane hydrophilic over long term.

A further CNT film coupon (~2.0 mg, 25 mm in diameter) was treated with poly(ethylene glycol) (EG800, MW 35000) methanol solution, then heated at 90° C. in vacuo for 24 hours, rinsed with water, dried in air and then treated with glycerol diglycidyl ether (GDGE) (100 μL) at 90° C. in vacuo for 24 hours. After the vacuum was released, the sample was kept in the oven at 90° C. for 30 minutes before it was removed, cooled to ambient temperature, and rinsed with methanol and water. The water flux reached 9.64 g/min when tested immediately after rinsing. Upon drying in air for 4 days, the water flux decreased to ca. 5 g/min. The CNT film was further dried in air for 1 day before it was treated with $SO_3$ triethylamine complex (100 mg) at 100° C. in vacuo for 24 hours. After the vacuum was released, the sample was kept in the oven at 100° C. for 30 minutes before it was removed, cooled to ambient temperature, and rinsed with water. The water flux reached 9.24 g/min when tested after rinse. Upon soaking in water for 7 days, the water flux increased to 10.75 g/min. Upon drying in air for 1 day, the water flux decreased to 7.46 g/min. The water flux remained at ca. 7 g/min after drying in air for another 3 days. However, upon additional drying in air for 3 days, the flux decreased slightly to ca. 5-6.5 g/min, indicating this combination of chemical processes is not optimal in rendering CNT film membrane hydrophilic over long term.

To a CNT film coupon (~2.0 mg, 25 mm in diameter) in a glass vial was added glycerol diglycidyl ether (100 μL) at 90° C. in vacuo for 24 hours. After the vacuum was released, the sample was kept in the oven at 90° C. for 30 minutes before it was removed, cooled to ambient temperature, and rinsed with methanol and water. The water flux reached 9.5~10.8 g/min. Without additional soaking in water, the CNT film was dried in air for 1 day and the water flux dropped to ~3 g/min. Further drying in air for 3 days led to a flux of ~1 g/min. The film was further dried in air for 1 day before it was subjected to $SO_3$ triethylamine complex (100 mg) treatment at 100° C. in vacuo for 24 hours. After the vacuum was released, the sample was kept in the oven at 100° C. for 30 minutes before it was removed, cooled to ambient temperature, and rinsed with water. The CNT film was soaked in water for 7 days and the flux stabilized at 8~9 g/min. Upon drying in air for a period of 1 day, 3 days and up to 12 days, the flux remained at ca. 8 g/min, demonstrating a more stable hydrating layer around CNT with glycerol diglycidyl ether followed by $SO_3$ triethylamine complex treatment.

To another CNT film coupon (~2.0 mg, 25 mm in diameter) in a glass vial was introduced $SO_3$ triethylamine complex (100 mg) at 100° C. in vacuo for 24 hours. After the vacuum was released, the sample was kept in the oven at 100° C. for 30 minutes before it was removed, cooled to ambient temperature, and rinsed with water. The water flux reached 14 g/min after soaking in water overnight. And the flux rate remained ca. 13 g/min after continuous soaking in water for 14 days. The flux rate remained at ca. 13 g/min upon drying in air for 1 day, indicating this process can render a more stable hydrophilic CNT membrane.

Additionally, a series of CNT film coupons (~2.0 mg each, 25 mm in diameter) in separate glass vials were treated with $SO_3$ triethylamine complex of different amount, i.e., 20 mg, 10 mg, 5 mg, 2.0 mg, 1.0 mg respectively at 100° C. in vacuo for 24 hours. After the vacuum was released, the sample was kept in the oven at 100° C. for 30 minutes before it was removed, cooled to ambient temperature, and rinsed with water. The flux rate was measured for each CNT film sample. When only 1.0 mg of $SO_3$ triethylamine complex was used, the resulting film had an initial flux of 6.7 g/min and the flux remained at 7.14 g/min after 4 days of soaking in water. When only 2.0 mg of $SO_3$ triethylamine complex was used, the initial flux was ca. 10 g/min and after 4 days of soaking in water, the flux increased to ca. 12.4 g/min. When 5 mg or more of $SO_3$ triethylamine complex was used, the flux reached ca. 13-16 g/min and remained at 12-14 g/min upon soaking in water. Treating the CNT sample (~2.0 mg each, 25 mm in diameter) with a large excess of $SO_3$ triethylamine complex (e.g., 100 mg) did not improve flux any further, suggesting only a thin layer of $SO_3$ triethylamine complex is responsible for the increased flux.

To a CNT film coupon (3.26 mg, 25 mm in diameter) in a vacuum glass jar was introduced $SO_3$ liquid dropwise (4~5 drops) from a warm steel cylinder container. There was visible liquid on the glass jar wall. CNT film coupon appeared wet by $SO_3$ liquid. The vacuum glass jar was clamped tight and placed under a heat lamp to maintain the temperature at ~40° C. for 48 hours. To the jar was added cold water (50 mL) and the CNT film was rinsed. The film appeared very soft in water and was soaked in water for 3 days before being assembled to test water flux. The flux rate reached 6.16 g/min and stayed between 7.80 g/min and 7.48 g/min after continuous soak in water for an additional 17 days. The film was subsequently dried in air for more than a week and weighed 4.00 mg. The substantial weight gain is likely due to $SO_3$ polymer formation around CNT surface. A visible coating layer is present around CNT under scanning electron microscopy (SEM). Energy dispersive X-ray spectroscopy (SEM-EDS) results also support the formation of $SO_3$ polymer around CNT surface. The S content in the CNT film treated with $SO_3$ were 4.51 weight % and 1.77 atomic %, while that for untreated CNT film were 1.23 weight % and 0.47 atomic %, respectively.

Tap water was collected that had a slight yellow hue and filtered through a CNT film filter in a dead-end filtration mode. The filtrate did not have a yellow hue. The CNT film filter was effective in removing the yellow contaminants, which was concentrated on the CNT film filter surface and could be wiped off from the CNT film filter surface with Chemwipe paper, indicating the CNT film filter is not prone to fouling.

A mixture of red vegetable oil and water was filtered through a CNT film filter in a dead-end filtration mode. The filtrate was colorless and water was completely removed from the oil which was collected on the filter. Upon wiping off the oil droplets, the flux rate for water was fully recovered, further indicating the CNT film filter was highly hydrophilic and not prone to fouling or contamination by hydrophobic oil.

An orange colored water solution of humic acid sodium salt (20 mg/L) (technical grade, Sigma-Aldrich) was filtered through a CNT film filter in a dead-end filtration mode. The filtrate had very slight yellow color, while most yellow material was collected on CNT filter. The yellow material was readily wiped off with Chemwipe. The flux rate for water was fully recovered, indicating the CNT film filter was able to partially remove humic substance without being fouled.

Rectangular CNT films (58 mm×75 mm) were assembled into flow cells (Sterlitech Corporation, USA) and tested in cross-flow mode for pure water permeability. As expected, a pristine CNT film had low water permeability of ca. 10.12 kg/(m²·h·bar) when transmembrane pressure was at 6.8 bar. Based on SEM image of the pristine CNT film, there were pores of the size of greater than 200 nm. For comparison, NF270 (Dow FilmTec, thin film composite), a semi-aromatic piperazine based polyamide nanofiltration membrane with average pore size of 0.84 nm has pure water permeability of 13.5 kg/(m²·h·bar). In contrast, a similar CNT film treated with $SO_3$ liquid for 2 days and subsequently soaked in water for 24 hours had an initial water permeability of ca. 990 kg/(m²·h·bar) when tested in cross-flow mode with transmembrane pressure of 6.8 bar. This dramatic increase in permeability demonstrate the effectiveness of kosmotropic molecules or ions in rendering CNT surface hydrophilic.

All of the compositions, materials, and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A hydrophilic film, comprising:
   a carbon nanotube (CNT) sheet prepared from floating catalyst chemical vapor deposition having a surface and
   a kosmotropic polymer or kosmotropic molecule,
   wherein the kosmotropic polymer or kosmotropic molecule is selected from the group consisting of $SO_3$, $SO_3$ polymer, $SO_3$ complex, and an ether or a polyether comprising at least one $OSO_3^-$ group.

2. The hydrophilic film of claim 1, wherein the kosmotropic polymer or kosmotropic molecule is $SO_3$, $SO_3$ polymer or $SO_3$ amine complex.

3. The hydrophilic film of claim 1, wherein the kosmotropic polymer is the ether or the polyether comprising at least one $OSO_3^-$ group.

4. The hydrophilic film of claim 1, wherein the polyether comprises at least one hydroxyl group.

5. The hydrophilic film of claim 1, wherein the ether or polyether is formed by reacting glycerol glycidyl ether with an —OH group or water.

6. The hydrophilic film of claim 1, wherein the ether or polyether is adjacent to a structured water layer on the surface of the graphitic material.

7. The hydrophilic film of claim 1, wherein the CNT sheet comprises CNTs selected from randomly oriented CNTs and partially aligned CNTs.

8. The hydrophilic film of claim 1, wherein the CNT film comprises CNTs that are randomly oriented CNTs.

9. The hydrophilic film of claim 1, wherein the kosmotropic polymer or kosmotropic molecule is non-covalently associated with the graphitic material.

10. A water-filtration membrane comprising the film of claim 1.

11. A method of removing water from an aqueous solution, comprising:
   introducing an aqueous solution into a device comprising a membrane, the membrane comprising a hydrophilic film which comprises:
      a carbon nanotube (CNT) sheet prepared from floating catalyst chemical vapor deposition having a surface and
      a kosmotropic polymer or kosmotropic molecule adjacent to the surface,
   wherein the kosmotropic polymer or kosmotropic molecule is selected from the group consisting of $SO_3$, $SO_3$ polymer, $SO_3$ complex, and an ether or a polyether comprising at least one $OSO_3^-$ group; and
   passing water through the membrane to produce filtered water.

12. The method of claim 11, wherein the kosmotropic polymer or kosmotropic molecule is $SO_3$, $SO_3$ polymer, or an $SO_3$ amine complex.

13. A process for preparing a hydrophilic film, comprising:
   providing a carbon nanotube (CNT) sheet prepared from floating catalyst chemical vapor deposition; and
   treating the sheet with a kosmotropic polymer or kosmotropic molecule selected from the group consisting of $SO_3$, $SO_3$ polymer, or an $SO_3$ complex, and an ether or a polyether comprising at least one $OSO_3^-$ group.

14. The process of claim 13, wherein the $SO_3$ complex is $SO_3$ triethylamine complex.

15. The process of claim 13, wherein the CNT sheet comprises CNTs selected from randomly oriented CNTs and partially aligned CNTs.

16. The process of claim 13, wherein the process further comprises heating the $SO_3$ amine complex and the graphitic material at a temperature ranging from 60° C. to 150° C.

17. The process of claim 13, wherein the process further comprises heating the $SO_3$ amine complex and the graphitic material at a temperature ranging from 60° C. to 150° C. under a reduced pressure.

18. The process of claim 13, wherein the graphitic material is treated with a weight ratio of the $SO_3$ amine complex to the graphitic material ranging from 0.1:1 to 50:1.

19. The process of claim 18, wherein the weight ratio of the $SO_3$ amine complex to the graphitic material ranges from 0.5:1 to 10:1.

* * * * *

UNITED STATES PATENT AND TRADEMARK OFFICE
CERTIFICATE OF CORRECTION

| | | |
|---|---|---|
| PATENT NO. | : 10,870,089 B2 | Page 1 of 1 |
| APPLICATION NO. | : 15/826406 | |
| DATED | : December 22, 2020 | |
| INVENTOR(S) | : Chunhong Li | |

It is certified that error appears in the above-identified patent and that said Letters Patent is hereby corrected as shown below:

In the Claims

In Claim 11, Column 15, Lines 28-29, delete "adjacent to the surface".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*